United States Patent
Nerad (10) Patent No.: US 10,126,770 B2
(45) Date of Patent: Nov. 13, 2018

(54) LOW POWER VOLTAGE REGULATOR

(71) Applicant: EM Microelectronic-Marin SA, Marin (CH)

(72) Inventor: Jiri Nerad, Prague (CZ)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 15/879,614

(22) Filed: Jan. 25, 2018

(65) Prior Publication Data

US 2018/0259988 A1 Sep. 13, 2018

(30) Foreign Application Priority Data

Mar. 10, 2017 (EP) .................................... 17160377

(51) Int. Cl.
| | | |
|---|---|---|
| G05F 1/565 | (2006.01) | |
| G05F 1/575 | (2006.01) | |
| H02M 3/157 | (2006.01) | |
| H02M 3/06 | (2006.01) | |
| H02M 1/00 | (2006.01) | |

(52) U.S. Cl.
CPC .............. *G05F 1/575* (2013.01); *H02M 3/06* (2013.01); *H02M 3/157* (2013.01); *H02M 2001/0032* (2013.01)

(58) Field of Classification Search
CPC .. H02M 2001/0019; H02M 2001/0016; G05F 1/462; G05F 1/46; G05F 1/562; G05F 1/56; G05F 1/563; G05F 1/565; G05F 1/62

See application file for complete search history.

(56) References Cited

U.S. PATENT DOCUMENTS

| | | | |
|---|---|---|---|
| 6,175,266 B1 | 1/2001 | Sharpe-Geisler | |
| 6,177,785 B1 | 1/2001 | Lee | |
| 9,778,303 B2 * | 10/2017 | Tumati | G01R 27/2605 |
| 2007/0182398 A1 | 8/2007 | Hahn | |
| 2010/0148742 A1 * | 6/2010 | Nakashima | G05F 1/56 323/288 |
| 2011/0148388 A1 * | 6/2011 | Zanchi | G11C 27/024 323/313 |
| 2011/0156670 A1 * | 6/2011 | Tadeparthy | G05F 1/56 323/273 |
| 2014/0217950 A1 | 8/2014 | Watanabe et al. | |
| 2015/0115918 A1 | 4/2015 | Oikarinen | |

(Continued)

OTHER PUBLICATIONS

European Search Report dated Sep. 22, 2017 in European Application 17160377.2, filed on Mar. 10, 2017.

*Primary Examiner* — Gary L Laxton
(74) *Attorney, Agent, or Firm* — Oblon, McClelland, Maier & Neustadt, L.L.P.

(57) ABSTRACT

A voltage regulator for driving a digital circuit includes an input terminal and an output terminal, a pass device and a first capacitor, and a boost circuit connected to the pass device or to the first capacitor and having a regulator boost input terminal connectable to the boost signal output terminal. The output terminal is connectable to a power terminal of a digital or switching circuit having at least a boost signal output terminal. The boost circuit includes a boost capacitor and a switching arrangement connected to the regulator boost input terminal and connected to the boost capacitor. The switching arrangement is controllable by a boost signal generated by the digital or switching circuit.

13 Claims, 3 Drawing Sheets

(56) References Cited

U.S. PATENT DOCUMENTS

2015/0123635 A1* 5/2015 Huang .................... G05F 1/575
                                                    323/281
2015/0198959 A1   7/2015 Kuttner

* cited by examiner

LOW POWER VOLTAGE REGULATOR

This application claims priority from European Patent Application No. 17160377.2 filed on Mar. 10, 2017, the entire disclosure of which is hereby incorporated herein by reference.

TECHNICAL FIELD

The present disclosure relates to the field of voltage regulators, and in particular to wideband low power voltage regulators for use with microprocessors, microcontrollers or other digital circuits. The disclosure further relates to a portable electronic device comprising such a voltage regulator.

BACKGROUND OF THE INVENTION

As the speed of microprocessors increases, consistent with CMOS transistor feature size reductions, the required power supply voltage continues to shrink. Increased load and higher processor speed result in more severe current transients on the microprocessor power supply. For example, as a microprocessor executes instructions, particularly at a comparatively fast rate, current transients may occur that may cause noise on the power supply, and may hence induce errors.

In typical implementations of a voltage regulator, the reaction of the regulator depends on a voltage difference between a load present at the output of the regulator and a reference voltage provided to the regulator. In response to a sudden increase of a load current, the load voltage drops before the regulator reacts. Consequently, a start time of a regulator reaction or adjustment never matches the start time of a change of a load present at the output of the regulator. This makes it in general rather difficult to prevent a narrow but possibly deep voltage dips on the load.

Solutions to this issue presented so far focus on an increase of the speed of a feedback loop of a regulator. Such solutions are quite power consuming and have therefore detrimental effects on battery lifetime. Moreover, even large capacitors in parallel with a load circuit may be of limited effect as such capacitors do not remove the fundamental need for a voltage difference to develop before the regulator circuit can react. Moreover, all technical solutions known so far have theoretical speed limitations.

Moreover, there is a growing number of low power or ultra-low power applications with strong emphasis on battery lifetime, which are normally operated at very low supply currents they are optimized for. In order to be of practical use, these applications and devices must also at least temporarily support high current modes where they receive commands or return data via external interfaces.

Moreover, one of main targets of electronic system design is competitive cost, leading to a strict requirement of minimum number of discrete components. In many systems in general and in portable devices in particular, regulator circuits cannot take advantage of external capacitors. Under such conditions, the integrated regulator circuit must provide a very fast and strong reaction to a sudden load change.

It is therefore an object of the present disclosure to provide an ultra-low power voltage regulator for driving a digital circuit that exhibits a rather fast, almost instantaneous reaction to varying loads. The voltage regulator should be simple and easy to implement. The implementation should be cost efficient an inexpensive and should enable fast and reliable regulation of a driving voltage for a digital circuit over a large range of supply currents.

The U.S. Pat. No. 6,177,785 B1 describes a voltage regulator for driving a switching circuit. The voltage regulator includes a programmable output adjustor, an error amplifier, and an output driver. The programmable reference generator is responsive to a first programming signal and generates a reference voltage. The programmable output adjustor is responsive to a second programming signal and generates an output adjust voltage. The error amplifier generates an error voltage corresponding to a difference between the reference voltage and the output adjust voltage. The output driver drives a regulated output voltage in response to the error voltage. However it is not defined two operating modes to be selected for preventing any narrow and deep voltage dips on a load at the output terminal of the voltage regulator, which is a drawback.

SUMMARY OF THE INVENTION

In one aspect there is provided a voltage regulator for driving a digital or switching circuit, e.g. a microprocessor. The voltage regulator comprises an input terminal and an output terminal. The output terminal is connectable to a power terminal of the digital or switching circuit. The digital or switching circuit has at least a boost signal output terminal.

The regulator has at least a pass device and a first capacitor. The regulator further has a boost circuit that has a regulator boost input terminal connectable to the boost signal output terminal of the digital circuit. The boost circuit is connected to the pass device and/or to the first capacitor. Typically, the pass device is implemented as a MOS transistor. The boost circuit of the voltage regulator further comprises at least a boost capacitor and a switching arrangement connected to the regulator boost input terminal and connected to the boost capacitor. The switching arrangement is controllable by a boost signal generated by and provided by the digital or switching circuit. The switching arrangement is deterministically controllable by the boost signal.

Typically, the input terminal of the regulator is an unregulated voltage input terminal. The output terminal of the regulator is a regulated voltage output terminal.

By means of the boost circuit and the interconnection of the boost circuit with the boost signal output terminal of the digital or switching circuit the voltage regulator can be switched between a low power mode and a high power mode on demand of the digital or switching circuit. In this way, the dynamic performance of the voltage regulator no longer depends on the speed of the regulator feedback loop configured to react to a variation of the load at the output of the regulator. Rather, and by means of the regulator boost input terminal connected to the boost signal output terminal of the digital or switching circuit, a digital signal generated by the digital or switching circuit can be directly provided to the regulator thus indicating that the load at the output terminal of the regulator will change or actually changes at a present instance of time.

In this way and at the moment or even prior to the instant in time where the load of the voltage regulator changes the regulator is triggered by a control signal to change the operation mode, thereby enabling an instantaneous reaction to a demand for varying loads. This design makes the use of a very fast feedback loop in the regulator rather unnecessary and enables an instantaneous reaction of the voltage regulator to varying demands of the digital or switching circuit.

Typically, the digital circuit comprises switching elements and the control signal to be generated by the digital circuit determines the start and/or the end of a digital activity or switching activity of the digital circuit. In this way, the digital control signal inherently coincides with a varying current load. The digital control signal provided and generated by the digital or switching circuit is instantaneously provided to the switching arrangement via the interconnection of the boost signal output terminal of the digital or switching circuit and the regulator boost input terminal of the regulator. The voltage regulator therefore has no longer a theoretical speed limit. It is hence enabled to instantaneously react to the varying load conditions at the output terminal. The present concept has no theoretical speed limit.

The regulator does not require a set up time before a digital or switching load activity occurs. The regulator assumes that the boost or control signal provided at the regulator boost input terminal has a positive edge right at the start of a load activity and has a negative edge at the end of a load activity of the digital or switching circuit. In this way, ultra-small regulator quiescent currents, e.g. in the range of nanoamperes, can be combined with sudden large load steps, e.g. in the range of tens or hundreds of microamperes. In this way an ultrafast, instantaneously reacting voltage regulator can be provided that is configured to handle load current over a comparatively large range, starting from nanoamperes or even less up to several hundred microamperes.

The purpose of the boost circuit is to provide an instantaneous modification of the charge stored in the first capacitor, typically implemented as a Miller capacitor. Such instantaneous charge modification can be effectively provided by the boost capacitor in combination with the switching arrangement connected to and controlled by the regulator boost input terminal.

The topology of the regulator further allows the design of low power regulated systems with strong transient load regulation performance at a minimum load capacitance, making it possible to avoid implementation of external components, such as capacitors. In this way, the overall geometric design of the regulator can be kept at a rather compact level. Such regulator circuits are typically called capacitor-less or "capless".

In typical embodiments the voltage regulator comprises at least a front stage or a front end and a back stage or a back end. The back stage or back end comprises the above-mentioned pass device and the first capacitor.

According to another embodiment the switching arrangement is configured to switch one terminal of the boost capacitor between a ground terminal and a regulated voltage at the output terminal. The other terminal of the boost capacitor is permanently connected to the gate of the pass device or pass transistor. Here, several further options exist: the latter plate of the boost capacitor can also be switched between ground and a full unregulated voltage, or between a ground terminal and a specific voltage generated by an external circuit or between two voltages generated by external circuits.

Assuming that the regulator is in a low power mode, in which the switched plate of the boost capacitor is connected to the output terminal, the boost capacitor is charged in accordance with its capacitance. Then and when transferring the regulator into the high power mode, the switched plate of the boost capacitor is connected to ground and the boost capacitor becomes connected between the gate of the output pass device and ground. This provides a boost charge and instantaneous adjustment of regulator output current, thereby preventing or counteracting any dips in the voltage level at the output terminal of the regulator.

Switching the boost capacitor between the ground terminal and a regulated voltage is preferred as the regulated voltage typically has a very small variation and this translates to reduced variation of the injected boost charge.

In a further embodiment of the voltage regulator the first capacitor comprises a so-called Miller capacitor that is connected to the output terminal and to the gate of the pass device. The Miller capacitor is permanently connected to the gate and drain of the pass device, wherein the drain of the pass device is connected to and identical to the regulator output.

Such a capacitor is typically denoted as a Miller capacitor and its purpose is to improve the stability of the regulator loop which is achieved at expense of reducing its speed.

In typical embodiments, the pass device or pass transistor with the Miller capacitor is preceded by a differential stage or differential amplifier, forming a topology called two stage Miller regulator. Such a differential stage or differential amplifier may form a front end or front stage of the voltage regulator and the pass device or pass transistor with the Miller capacitor may form a back end or back stage of the voltage regulator.

In typical applications and according to another embodiment, the boost capacitor is switched in such a way that in low power mode it is connected to the gate of the pass device and to the regulator output that is in parallel with the Miller capacitor. In low power mode, the boost capacitor is located between the gate of the pass device and the regulator output.

Only in high power mode the boost capacitor is connected to the gate of the pass device and ground. It is then located between the pass device and ground. On the one hand, this gives an increase of the effective Miller capacitance and therefore improves stability at low load. On the other hand, it further provides effective Miller capacitance reduction giving fast response at high load.

In typical implementations and according to another embodiment, the capacitance of the Miller capacitor is larger than or equal to the capacitance of the boost capacitor. In this way, the boost capacitor is a supplementary capacitor to modify the charge stored in the Miller capacitor on demand, namely in the moment of switching the regulator from the low power mode to the high power mode.

In another embodiment, the switching arrangement comprises a PMOS type switching device and an NMOS type switching device. In one embodiment, the switching arrangement may consist of a PMOS type switching device and an NMOS type switching device both connected to the switched plate of the boost capacitor. By means of different types of switching devices, such as a PMOS transistor and an NMOS transistor a rather simple and robust implementation of a switching arrangement can be created that provides an instantaneous switching of the boost capacitor in response to a signal obtained from the boost signal output terminal of the digital load.

In one embodiment, the regulator boost input terminal is connected to the gate of the PMOS type switching device and to the gate of the NMOS type switching device. As soon as a rising or falling edge is provided to the regulator boost input terminal from the boost signal output terminal of the digital or switching circuit both switching devices of the switching arrangement may instantaneously swap their switching state. In this way a rather fast, reliable and effective switching of the boost capacitor can be provided.

According to another embodiment, the switching arrangement is switchable between a low power configuration and a boost configuration, hence a high power configuration. When in the low power configuration or in the low power mode, the boost capacitor is connected to the gate of the pass device and to the regulator output, that is in parallel to the Miller capacitor. When in the boost configuration or in the high power mode, the boost capacitor is connected to the gate of the pass device and to ground. When in the low power configuration the boost capacitor may be charged. When switched into the boost configuration or high power mode the switched plate of the boost capacitor is disconnected from the regulator output and is connected to ground. Electrical charge previously accumulated in the boost capacitor can be then be directly redistributed into the Miller capacitor so as to change the voltage at the gate of the pass device and further to increase the regulator output current and to stabilize the voltage on the output terminal of the regulator. When in the boost configuration the boost capacitor forms a capacitor divider with the Miller capacitor.

According to another embodiment, one terminal of the boost capacitor is connected to a first node. This first node is further connected to a drain of the PMOS type switching device. The first node is also connected to a drain of the NMOS type switching device of the switching arrangement. Said plate or terminal of the boost capacitor is connected to the first node, while another terminal of the boost capacitor is permanently connected to a gate terminal of the pass device. In this way and by swapping the state of the PMOS type switching device and the NMOS type switching device, said plate or terminal of the boost capacitor can be disconnected from the regulator output terminal and connected or tied to the ground terminal upon switching of the regulator from the low power mode or low power configuration to the high power mode or boost configuration.

In another embodiment, a gate of the PMOS type switching device and a gate of the NMOS type switching device are connected to the regulator boost input terminal. In this way and when receiving a switching signal via the regulator boost input terminal the PMOS type switching device and the NMOS type switching device may instantaneously and concurrently swap their states and disconnect said plate or terminal of the boost capacitor from the regulator output and connect it to ground. There is no theoretical speed limit for such switching process.

According to another embodiment, the boost capacitor is connected to a second node that is connected to a gate of an output pass device having a source connected to the unregulated voltage input terminal or regulator input terminal and having a drain connected to the regulated voltage output terminal or regulator output terminal. The output pass device may be implemented as a MOSFET transistor, e.g. as a PMOS transistor. Alternatively, it may be implemented as an NMOS transistor.

In another embodiment, the switching arrangement comprises an edge detector and a current starved inverter. In general, any activity on the regulator boost input terminal may trigger a respective boost reaction while a period of no activity enables a slow recovery at a defined speed. By implementing the switching arrangement with an edge detector in combination with a starved inverter an adaptive solution can be provided and a highly irregular activity can be correctly handled. This is of particular benefit in cases where providing or generating a well-defined digital control signal on the boost signal output terminal, that is representative of a load current consumption of the digital or switching circuit, is difficult.

The edge detection combined with an unsymmetrical boost inverter can adjust a boost action to highly irregular load activity while maintaining a strong response at each start or restart of a load activity of the digital or switching circuit. A non or unsymmetrical inverter can be further used to obtain different boost currents or different boost transition speeds for load start and load end, i.e. when switching the voltage regulator from the low power mode to the high power mode and vice versa, from the high power mode to the low power mode.

In another embodiment, an input of the edge detector is connected to the regulator boost input terminal. In this way, the edge detector is configured and enabled to monitor a sequence of signals provided at the regulator boost input terminal and/or at the boost signal output terminal of the digital load. Such a topology can adjust boost action to highly irregular load activity while maintaining strong response at each start or restart of the load activity of the digital or switching circuit.

In another embodiment, the switched boost capacitor is added to a differential amplifier that forms a part of all linear regulators. The addition of said switched boost capacitor to said differential amplifier does not cancel or prevent the linear function of that amplifier. Furthermore, such combination tolerates an incorrect timing of a boost signal obtained from the boost signal output terminal or even false boost signals, i.e. boost signals or control signals that do not correspond to load current changes. This tolerance of the regulator is due to the fact said differential amplifier does not join the boost action if no significant voltage difference exists between the reference input and the load of the circuit.

In a further embodiment, the voltage regulator comprises an adaptive bias circuit connected to the pass device and to a front stage of the regulator. The front stage of the regulator may comprise a differential amplifier, featuring the topology of a two stage Miller regulator.

According to another embodiment, the adaptive bias circuit comprises a current mirror topology that is configured to generate a mirror current that is equal to a fraction of the current flowing through the pass device. The adaptive bias circuit and the current mirror topology are configured to add the mirror current to a static bias current of the front stage of the voltage regulator.

By means of the adaptive bias an effect of the boost charge provided by the boost capacitor can be even enhanced. When the boost charge injection provided by the boost capacitor comes in the low power mode, the adaptive bias amplifies this effect as the adaptive bias circuit and the front stage of the regulator form a positive feedback loop whenever the front stage sees a positive difference between the reference voltage and the regulator output voltage, that is whenever the regulator output voltage is lower than its target. At a high power mode, the effect of boost charge transfer in either direction is limited as it is relatively small in comparison with total static bias current in the front stage of the regulator. The static terminal current is typically increased by the adaptive bias circuit. The combination of the adaptive bias circuit with the switching arrangement and the deterministic switching thereof controlled by the digital or switching circuit itself is beneficial to provide a strong reaction of the regulator at the beginning of large load activity while it reduces sensitivity of the regulator reaction to further activity of the boost switches during that increased load activity. The combination of a strong reaction at start of a load activity and a reduced sensitivity to the boost control signal changes during that activity is of particular benefit in most low-power applications as it reduces digital design overhead associated with generating the digital boost signal.

According to another aspect, there is provided a portable electronic device comprising a voltage regulator as described above and further comprising at least a first digital or switching circuit having at least a boost signal output terminal connected to the regulator boost input terminal of the regulator. The portable electronic device may be configured as a fitness tracker, a wrist watch, a smart phone or various other portable electronic devices that are typically driven by a battery or a solar cell. The low-power regulator and the interaction with the digital or switching circuit are of particular benefit to reduce current consumption to a minimum when in a low power mode and to instantaneously provide sufficient current on demand.

According to a further embodiment, the portable electronic device further comprises a second digital or switching circuit, wherein the voltage regulator comprises a first regulator boost input terminal connected to the boost node of the first digital or switching circuit and further comprises a second regulator boost input terminal connected to the boost node of the second digital or switching circuit. In principle, the regulator can be connected to multiple digital or switching circuits. In effect, a parallel combination of multiple digital or switching circuits can be connected and driven by one and the same voltage regulator, provided that the regulator comprises a separate regulator boost input terminal for each one of the digital or switching circuits. In this way, multiple loads or digital or switching circuits can be powered by a single regulator on condition that digital control signals provided by each digital or switching circuit meets the above described requirements and are available for each loading block of the regulator. This allows for a superposition of partial regulator adjustment to load changes coming from individual loading blocks.

In this way, the above described topology of a voltage regulator in combination with at least one digital or switching circuit can be used in a single stage, multistage as well as in a multipath regulator design, where the dominant time constant is associated with lumped capacitance.

Moreover, the boost circuit, i.e. the switching arrangement in combination with the boost capacitor can be optimized for minimum undershoot, minimum overshoot or minimum settling time of the regulator output voltage transient at the start and/or end of digital or switching activity. A specific design of the boost circuit may be obtained by appropriately designing the boost capacitance, switch device dimensions, or current limits in the starved inverter if one is used.

In general, it should be acknowledged that the above described topology allows the design of low power regulator systems with strong transient load regulation performance at minimum load capacitance, thus making it possible to avoid an implementation of numerous external components, such as capacitors. The topology further offers instantaneous operating point transition that is aligned with output load change, depends only on capacitor charge redistribution via switch devices, and has therefore no theoretical speed limit.

BRIEF DESCRIPTION OF THE DRAWINGS

In the following, embodiments of the regulator are illustrated by making reference to the drawings, in which.

DETAILED DESCRIPTION OF THE INVENTION

Figure 1:
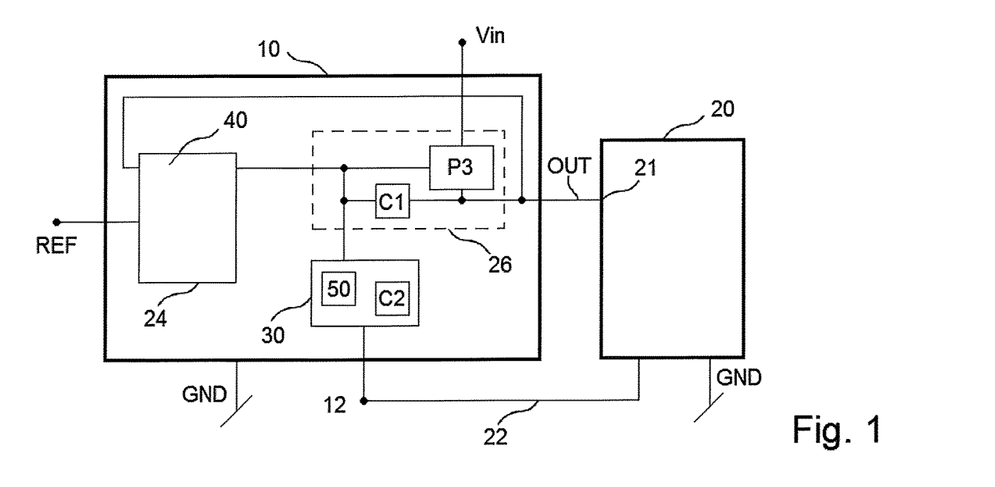
FIG. 1 shows a schematic block diagram of the voltage regulator in combination with a digital or switching circuit.

In FIG. 1, a simplified and schematic block diagram of a voltage regulator 10 is provided. The voltage regulator 10 is connected to a power terminal 21 of a digital or switching circuit 20. The digital or switching circuit 20 may comprise a microprocessor or microcontroller or a similar digital switching or digital processing device. The voltage regulator 10 comprises an input terminal Vin and an output terminal OUT. The output terminal OUT is connected to the power terminal 21 of the digital or switching circuit 20.

The voltage regulator 10 further comprises a front stage 24 or front end and a back stage 26 or back end.

Typically, the front stage 24 comprises an amplifier circuit 40 that may be implemented as a differential amplifier that will be explained in more detail in FIG. 3. The regulator 10 further comprises a regulator boost input terminal 12 that is connected to a boost signal output terminal 22 of the digital or switching circuit 20. Moreover, the regulator 10 and the digital or switching circuit 20 are connected to the ground terminal GND.

The back stage 26 comprises a pass device P3 and a first capacitor C1. The pass device P3 is typically implemented as a transistor and the first capacitor C1 operates as a so-called Miller capacitor.

Via the regulator boost input terminal 12 the regulator 10 receives a boost signal generated by the digital or switching circuit 20 and provided via the boost signal output terminal 22. In this way and as soon as a load activity of the digital or switching circuit 20 starts, the regulator 10 immediately receives a respective boost signal which triggers instantaneous transition of the regulator 10 from a low power mode into a high power mode or vice versa. The regulator performance no longer depends on the speed of the conventional feedback loop that senses or detects whether the load at the output terminal OUT changes. Rather, and concurrent to a switching or a processing activity of the digital or switching circuit 20 the voltage regulator 10 is deterministically switched from a low power mode into a high power mode or vice versa.

In order to provide an efficient and fast switching, the regulator 10 comprises a boost circuit 30 that is connected to the gate of the pass device P3 and to the regulator boost input terminal 12. The boost circuit 30 comprises at least a boost capacitor C2 and a switching arrangement 50. The switching arrangement 50 is connected to the regulator boost input terminal 12 and is further connected to the boost capacitor C2. The switching arrangement 50 is controllable by a boost signal that is generated by the digital or switching circuit 20. Since the switching arrangement 50 is connected to the regulator boost input terminal 12, a control signal or boost signal generated by the digital or switching circuit 20 is transferred via the connection of the boost signal output terminal 22 to the regulator boost input terminal 12 and hence to the switching arrangement 50.

Figure 2:
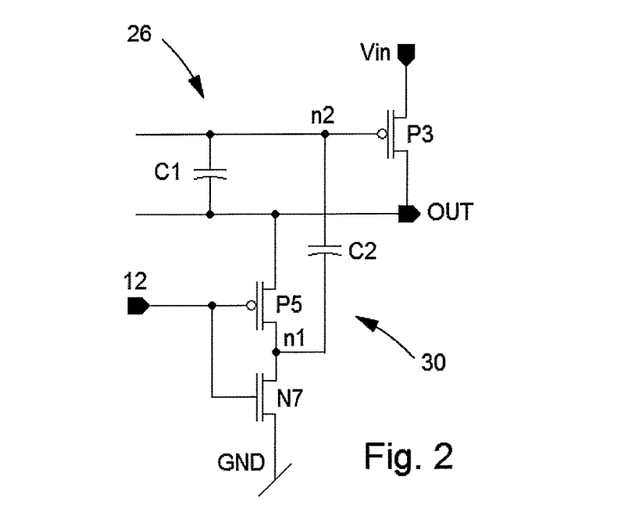
FIG. 2 shows a schematic block diagram of the switching arrangement.

The switching arrangement 50 together with the boost circuit 30 and the regulator pass device P3 is shown in more detail in FIG. 2. The switching arrangement 50 comprises a PMOS type switching device P5 and an NMOS type switching device N7. As illustrated in FIG. 2, the NMOS type and PMOS type switching devices are implemented as NMOS transistor and PMOS transistor, N7 and P5, respectively.

The gates of the switching transistors P5 and N7 are both connected to the regulator boost input terminal 12. In this way, the PMOS transistor P5 and the NMOS transistor N7 are switchable concurrently as a rising edge is provided from the boost signal output terminal 22 of the digital or switching circuit 20. The drain of the transistor P5 and the drain of the transistor N7 are connected to a first node n1. The first node n1 is further connected to the boost capacitor C2. An opposite terminal of the boost capacitor C2 is connected to a second node n2. The second node n2 is connected to one terminal of a first capacitor C1, presently implemented as a Miller capacitor C1 while an opposite terminal of the Miller capacitor C1 is connected to the output terminal OUT. The second node n2 is also connected to the gate terminal of the pass device P3.

When in a low power mode the PMOS transistor P5 is conducting while the NMOS transistor N7 is non-conducting. In this configuration the boost capacitor C2 and the Miller capacitor C1 are connected in parallel. If a rising edge is provided to the regulator boost input terminal 12, the two CMOS switching devices P5 and N7 are subject to a concurrent switching. Then, the switching device N7 becomes conductive or closed while the switching device P5 becomes non-conducting or open. Consequently, the boost capacitor C2 is now connected between node n2 and ground terminal GND and the Miller capacitor C1 and the boost capacitor C2 are now connected in series, forming a capacitive divider. A charge previously accumulated in the boost capacitor C2 can then be redistributed to the Miller capacitor C1. In effect, instantaneous voltage transition can be provided at the gate of the pass device P3, thereby increasing the current flowing into the output terminal OUT at an early stage of a regulator action in response to a varying load condition.

The boost operation has no theoretical speed limit as it is based on charge redistribution between capacitors connected either directly or via switches. Furthermore, the strength of boost action can be controlled and designed by the ratio of the capacitance of the output capacitor C1 and the boost capacitor C2.

The regulator 10 further comprises an output pass device, presently implemented as a PMOS type transistor P3. A source of P3 is connected to the input terminal Vin and a drain of P3 is connected to the output terminal OUT. The second node n2 is connected to the gate of the output pass device P3 and hence to the PMOS transistor P3. As the regulator 10 and hence the switching arrangement 50 is switched from a low power mode to a higher power mode, voltage potential at the gate of the output pass device P3 can be immediately adjusted since the boost capacitor C2 is connected to the second node n2 and hence to the gate of the output pass device P3. Therefore, switching of the boost capacitor C2 provides immediate adjustment to the operation of the output pass device P3.

Figure 3:
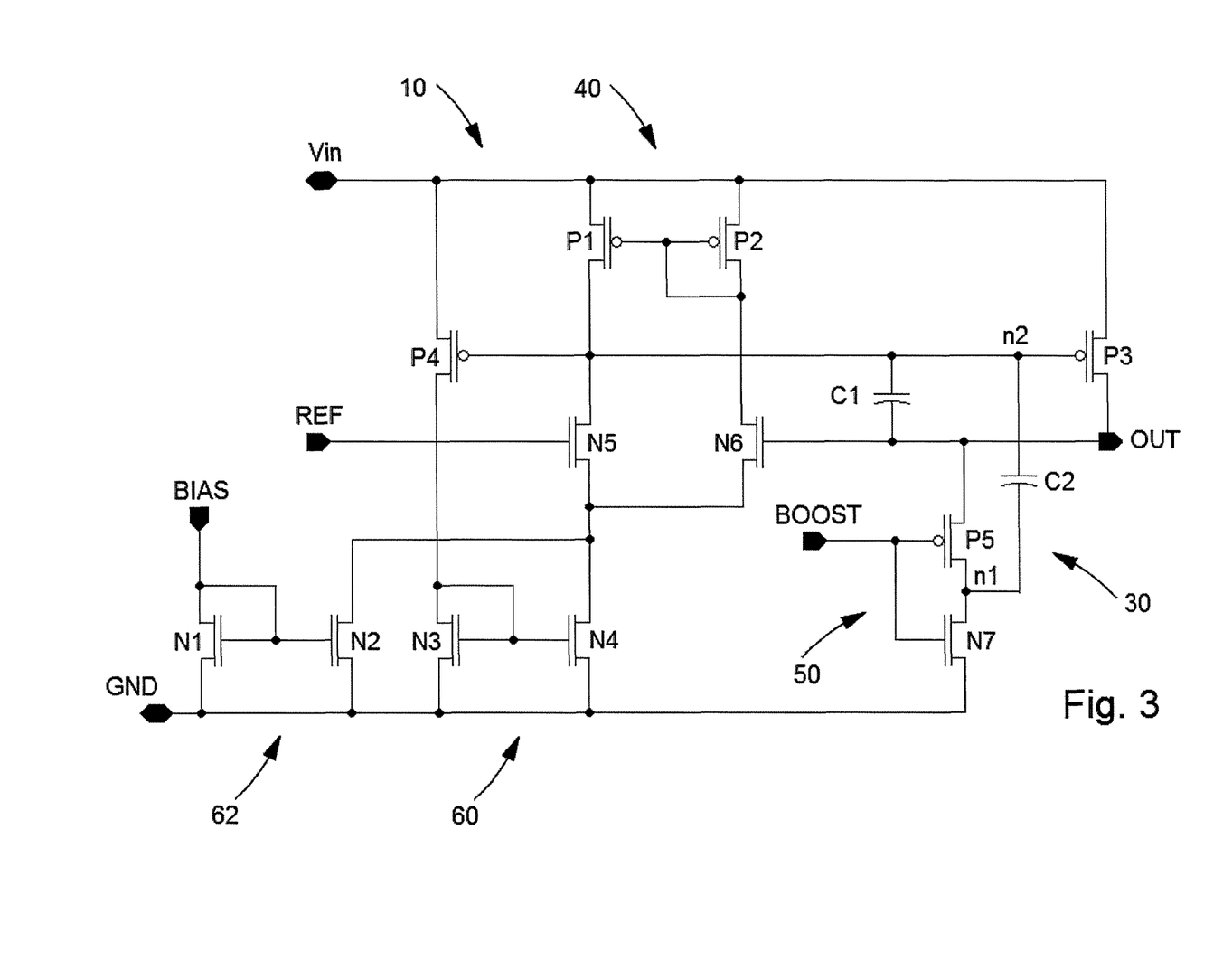
FIG. 3 shows a schematic block diagram of the entire regulator according to one embodiment.

In FIG. 3, the implementation of the boost circuit 30 and the switching arrangement 50 in the regulator 10 is illustrated in more detail. As indicated there, the regulator 10 comprises a bias terminal BIAS, and a reference node REF. The bias terminal is connected to a current mirror 62 formed by two NMOS type devices, namely a first NMOS transistor N1 and a second NMOS transistor N2. The current mirror 62 forms a constant bias circuit of the front stage or front end of the regulator 10. The drain of the transistor N1 is connected to the bias terminal BIAS while the gates of both transistors N1 and N2 are connected to the bias terminal BIAS.

A drain of the second transistor N2 is connected to the source terminals of the input differential transistors N5, N6

There is further provided an adaptive bias circuit 60 which is formed by another current mirror comprising two further NMOS type switching devices N3 and N4. Also here, the gates of transistors N3, N4 are mutually interconnected. The sources N3 and N4 are connected to the ground terminal GND, while the drain of N3 is connected to the drain of another PMOS device P4 and the drain of the transistor N4 is connected to the source terminals of the input differential transistors N5, N6.

The PMOS switching device P4 is a scaled copy of P3. The gates of the transistors P3 and P4 are mutually connected. The sources of P3 and P4 are both connected to the unregulated input terminal Vin.

There is further provided an amplifier core 40 that comprises two PMOS transistors P1, P2 arranged in a current mirror configuration and which further comprises two NMOS transistors N5 and N6. The source of N5 is connected to the source of N6. A gate of N5 is connected to the reference REF and the gate of N6 is connected to the regulated output terminal OUT. The drain of N5 is connected to the gates of P3 and P4 and the drain of N6 is connected to the drain of P2. The sources of P1 and P2 are both connected to the input terminal Vin and to the source of P3.

The adaptive bias circuit 60 enhances the effect of boost charge provided by the boost capacitor C2. When a boost charge injection comes in the low power mode, the adaptive bias circuit 60 amplifies this effect thanks to positive feedback that exists in the loop formed by the bias devices P4, N3, N4 and the amplifier core 40 if the voltage at the output terminal OUT is smaller than the voltage at the reference REF. In contrast, at high power, the effect of a boost charge transfer, in either direction, is limited as it is relatively small in comparison with static terminal currents in a front stage of the regulator 10. In situations where there should be an incorrect boost signal at the regulator boost input terminal 12 the adaptive bias 60 will not join. The adaptive bias 60 will only contribute and enhance the effect of the boost capacitor C2 if the voltage at the output terminal OUT is smaller than the voltage at the reference REF. Moreover, the adaptive bias circuit only provides a substantial effect when the output terminal and hence the regulator is driven in low power mode.

In typical implementations, the capacitance of the Miller capacitor C1 is larger than the capacitance of the boost capacitor C2. When the regulator 10 is switched from a low power mode into a high power mode and when the boost capacitor C2 and the charge stored therein supplies an extra charge to the Miller capacitor C1, the voltage at gate of output pass device P3 is instantaneously adjusted and the current via this device is instantaneously increased so as to react stronger and quicker to a varying load at the output terminal OUT.

In the further embodiment according to FIG. 4, the boost circuit 30 as explained in connection with FIGS. 2 and 3 has been replaced by a boost circuit 130. In comparison to the boost circuit 30 of FIG. 2 the boost circuit 130 comprises two additional PMOS devices P6 and P7. The PMOS transistor P6 is in line with the PMOS transistor P5. The source of P6 is connected to the output terminal OUT. The drain of P6 is connected to the source of P5 and the drain of P5 is connected to one terminal of the boost capacitor C2.

The other terminal of the boost capacitor C2 is still connected to the gate of the output pass device P3.

The gate of P5 is connected to the gate of N7. Furthermore, the gates of P5 and N7 are connected to the output of a XOR gate or exclusive OR gate 72 that works here as a binary comparator. The gate or comparator 72 is part of an edge detector 70 that is connected to the regulator boost input terminal 12. The edge detector 70 further comprises a delay circuit 74 arranged between the regulator boost input terminal 12 and one input of the comparator 72. The other input of the comparator 72 is directly connected to the regulator boost input terminal 12.

Compared to the simple boost inverter as shown in FIG. 2 and formed by the transistors P5 and N7 the arrangement of the edge detector 70 in combination with the starved inverter 80 as formed by the transistors P5, P6 and N7 provides an unsymmetrical output drive. Any activity on the regulator boost input terminal 12 may trigger a strong boost reaction through the NMOS side in the starved inverter 80 while a period of no activity leads to a slow recovery or recharge of the boost capacitor C2 at a defined speed or velocity. The implementation as shown in FIG. 4 is adaptive and can handle highly irregular load activity and can be used in those cases where finding or generating of a digital control signal to be provided at the regulator boost input terminal 12 being representative of a load current consumption is difficult to obtain.

Figure 4:
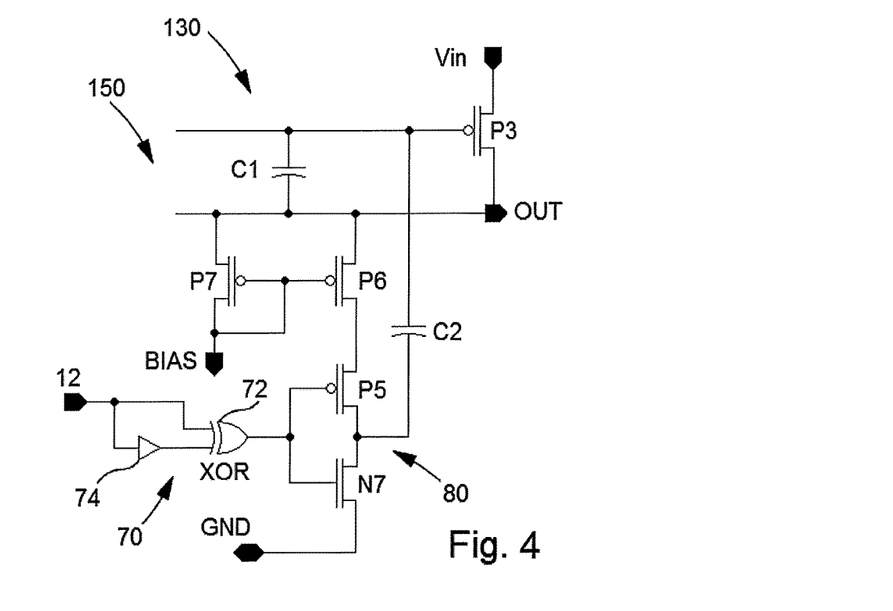
FIG. 4 shows a schematic block diagram of another switching arrangement.

Moreover, the implementation according to FIG. 4 also differs from FIG. 3 wherein the further additional PMOS transistor P7 forms a current mirror with the transistor P6. Here, the gates of P7 and P6 are connected. The source of P7 is connected to the source of P6. Both sources as well as one terminal of the output capacitor C1 are connected to the output terminal OUT of the regulator 10.

Figure 5:
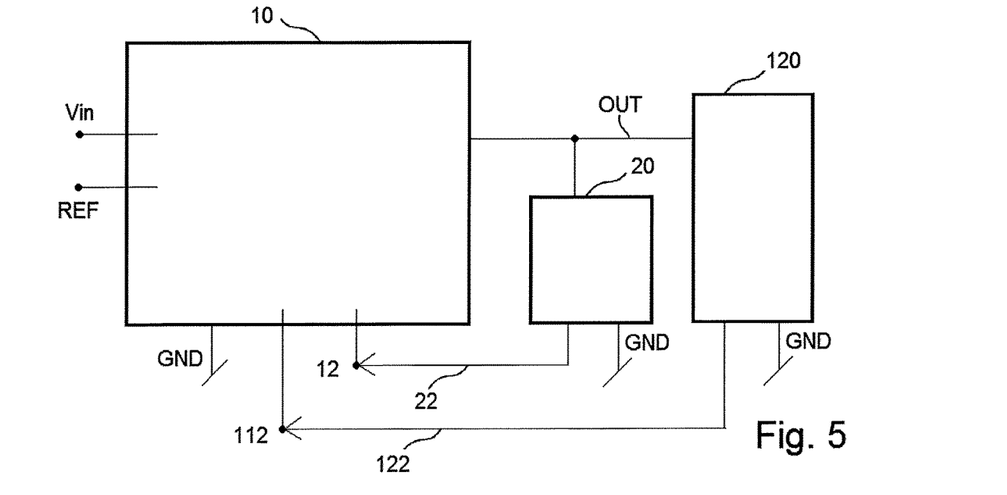
FIG. 5 is a schematic block diagram of a voltage regulator connected to two separate digital or switching circuits.

In FIG. 5, a further implementation of a voltage regulator with at least two digital or switching circuits 20, 120 is schematically shown. Here, the voltage regulator 10 not only comprises one but at least two or even several regulator boost input terminals 12, 112. Each regulator boost input terminal 12, 112 is connected to at least one boost signal output terminal 22, 122 of a first digital or switching circuit 20 and of a second digital or switching circuit 120, respectively. In this way a single voltage regulator 10 may be configured and may be adapted to drive not only one digital or switching circuit 20 but multiple digital or switching circuits 20, 120 concurrently.

What is claimed is:

1. A voltage regulator for driving a digital or switching circuit, the voltage regulator comprising:
    an input terminal and an output terminal, wherein the output terminal is connectable to a power terminal of a digital or switching circuit having at least a boost signal output terminal;
    a pass device having a gate terminal and being connected between the input terminal and the output terminal;
    a first capacitor connected between the output terminal of the voltage regulator and a gate of the pass device; and
    a boost circuit including a boost capacitor, a switching arrangement, and a regulator boost input terminal connectable to the boost signal output terminal of the digital or switching circuit,
    wherein the switching arrangement is arranged switchable to connect the boost capacitor either in parallel to the first capacitor according to a low power configuration, or between the gate of the pass device and a ground according to a boost configuration, based on a boost signal received at the regulator boost input terminal from the digital or switching circuit.

2. The voltage regulator according to claim 1, wherein the first capacitor includes a Miller capacitor connected between the output terminal and the gate of the pass device.

3. The voltage regulator according to claim 1, wherein a capacitance of the first capacitor is larger than or equal to a capacitance of the boost capacitor.

4. The voltage regulator according to claim 1, wherein the switching arrangement includes a PMOS type switching device and an NMOS type switching device.

5. The voltage regulator according to claim 4, wherein the boost capacitor is connected to a first node that is connected to a drain of the PMOS type switching device and to a drain of the NMOS type switching device.

6. The voltage regulator according to claim 5, wherein a gate of the PMOS type switching device and a gate of the NMOS type switching device are connected to the regulator boost input terminal.

7. The voltage regulator according to claim 5, wherein the boost capacitor is connected to a second node that is connected to the gate of the pass device, which is a PMOS type switching device having a source connected to the input terminal and having a drain connected to the output terminal.

8. The voltage regulator according to claim 1, wherein the switching arrangement includes an edge detector and a starved inverter.

9. The voltage regulator according to claim 8, wherein an input of the edge detector is connected to the regulator boost input terminal.

10. The voltage regulator according to claim 1, further comprising an adaptive bias circuit connected to the pass device and to an amplifier circuit of the regulator.

11. The voltage regulator according to claim 10, wherein the adaptive bias circuit includes a current mirror topology configured to generate a mirror current equal to a fraction of a current flowing through the pass device and configured to add the mirror current to a static bias current of the amplifier circuit.

12. A portable electronic device comprising:
    the voltage regulator according to claim 1; and
    at least a first digital or switching circuit having at least a boost output terminal connected to the regulator boost input terminal of the voltage regulator.

13. The portable electronic device according to claim 12, further comprising a second digital or switching circuit, wherein the voltage regulator comprises at a first regulator boost input terminal connected to the boost output terminal of the first digital or switching circuit and includes a second regulator boost input terminal connected to the boost output terminal of the second digital or switching circuit.

* * * * *